United States Patent
Koiwa et al.

(10) Patent No.: US 10,050,292 B2
(45) Date of Patent: Aug. 14, 2018

(54) METHOD FOR CONTROLLING FUEL CELL SYSTEM

(71) Applicant: HONDA MOTOR CO., LTD., Tokyo (JP)

(72) Inventors: Nobuki Koiwa, Wako (JP); Osamu Ogami, Wako (JP); Yusai Yoshimura, Wako (JP); Akiji Ando, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 15/412,055

(22) Filed: Jan. 23, 2017

(65) Prior Publication Data

US 2017/0250422 A1    Aug. 31, 2017

(30) Foreign Application Priority Data

Feb. 26, 2016    (JP) .................. 2016-035382

(51) Int. Cl.
*H01M 8/04*        (2016.01)
*H01M 8/04746*     (2016.01)
(Continued)

(52) U.S. Cl.
CPC ... *H01M 8/04753* (2013.01); *H01M 8/04201* (2013.01); *H01M 8/04783* (2013.01);
(Continued)

(58) Field of Classification Search
CPC ......... H01M 8/04753; H01M 8/04201; H01M 8/04895; H01M 8/04634
See application file for complete search history.

(56) References Cited

U.S. PATENT DOCUMENTS 8,043,753 B2 * 10/2011 Mohri ............... H01M 8/04126
                                                        429/413
9,093,679 B2 *  7/2015 Morita .............. H01M 8/04388
                          (Continued)

FOREIGN PATENT DOCUMENTS

JP    2006-196231    7/2006
JP    2011-216259   10/2011
WO    WO2013/157488 10/2013

OTHER PUBLICATIONS

Japanese Office Action for corresponding JP Application No. 2016-035382, dated Aug. 8, 2017.

*Primary Examiner* — Abdullah Riyami
*Assistant Examiner* — Nader Alhawamdeh
(74) *Attorney, Agent, or Firm* — Mori & Ward, LLP

(57) ABSTRACT

A method for controlling a fuel cell system including a fuel cell which includes an anode electrode and a cathode electrode sandwiching a solid polymer electrolyte membrane therebetween, includes driving a pump to supply an oxidant gas to the cathode electrode. The pump has a minimum supply amount of the oxidant gas. A fuel gas is supplied to the anode electrode to generate electric power via an electrochemical reaction between the fuel gas and the oxidant gas. It is determined whether a target amount of the oxidant gas to be supplied to the cathode electrode is lower than the minimum supply amount. An opening degree of a pressure adjusting valve is adjusted to adjust an amount of the oxidant gas supplied to the cathode electrode to be the target amount when the target amount is determined to be lower than the minimum supply amount.

16 Claims, 2 Drawing Sheets

(51) Int. Cl.
*H01M 8/04082* (2016.01)
*H01M 8/04992* (2016.01)
*H01M 8/1004* (2016.01)
*H01M 8/1018* (2016.01)

(52) U.S. Cl.
CPC ..... *H01M 8/04992* (2013.01); *H01M 8/1004* (2013.01); *H01M 2008/1095* (2013.01)

(56) References Cited

U.S. PATENT DOCUMENTS

| | | | | |
|---|---|---|---|---|
| 9,640,818 | B2* | 5/2017 | Furuyama | H01M 8/0488 |
| 2008/0187790 | A1* | 8/2008 | Kamihara | H01M 8/04231 |
| | | | | 429/429 |
| 2012/0015257 | A1* | 1/2012 | Arisawa | B60K 1/04 |
| | | | | 429/400 |
| 2012/0077102 | A1* | 3/2012 | Morita | H01M 8/04388 |
| | | | | 429/429 |
| 2013/0095402 | A1* | 4/2013 | Furuyama | H01M 8/0488 |
| | | | | 429/427 |
| 2014/0080018 | A1* | 3/2014 | Ohgami | H01M 8/04097 |
| | | | | 429/415 |
| 2014/0162151 | A1* | 6/2014 | Mohri | H01M 8/04835 |
| | | | | 429/413 |

* cited by examiner

METHOD FOR CONTROLLING FUEL CELL SYSTEM

CROSS-REFERENCE TO RELATED APPLICATIONS

The present application claims priority under 35 U.S.C. § 119 to Japanese Patent Application No. 2016-035382, filed Feb. 26, 2016, entitled "Method for Controlling Fuel Cell System." The contents of this application are incorporated herein by reference in their entirety.

BACKGROUND

1. Field

The present disclosure relates to a method for controlling a fuel cell system.

2. Description of the Related Art

A solid polymer electrolyte fuel cell includes a membrane electrode assembly (MEA), in which an anode electrode is disposed on one surface of an electrolyte membrane, which is a proton-conductive polymer ion-exchange membrane, and a cathode electrode is disposed on the other surface of the electrolyte membrane. The membrane electrode assembly and separators, sandwiching the membrane electrode assembly, constitute a power generation cell (unit cell). Typically, a predetermined number of power generation cells are stacked and, for example, mounted in a fuel cell vehicle (a fuel cell electric automobile or the like) as a vehicle fuel cell stack.

When the fuel cell is operated, a fuel gas (such as hydrogen gas) is supplied to the anode electrode and an oxidant gas is supplied to the cathode electrode. Therefore, the fuel cell has a fuel gas tank, a fuel gas pump, a fuel gas supply channel, an oxidant gas pump, a fuel gas discharge (circulation) channel, a humidifier, an oxidant gas supply channel, an oxidant gas discharge channel, and the like. These components constitute a fuel cell system.

Typically, compressed air is used as the oxidant gas, because air is abundant and compressed air can be easily obtained by compressing air. In this case, an oxidant gas pump (air pump) compresses air and supplies the compressed air to the cathode electrode. The supply pressure of compressed air, that is, the internal pressure of the cathode electrode is controlled by adjusting the opening degree of a pressure adjusting valve that is disposed in the oxidant gas discharge channel, as described in Japanese Unexamined Patent Application Publication No. 2006-196231 (in particular, paragraph [0016]).

The air pump compresses and supplies air as a motor rotates. As the rotation speed of the motor increases, the compressed air can be supplied at a higher flow rate. In other words, when the motor is rotating at the lowest rotation speed, the air flow rate is the lowest. The air flow rate at this time is the lowest supply flow rate.

SUMMARY

According to one aspect of the present invention, a method for controlling a fuel cell system including a fuel cell that includes a membrane electrode assembly in which a solid polymer electrolyte membrane is sandwiched between an anode electrode and a cathode electrode and that generates electric power by causing an electrochemical reaction between a fuel gas that is supplied through a fuel gas supply channel to the anode electrode and an oxidant gas that is supplied through an oxidant gas supply channel to the cathode electrode, an oxidant gas supply mechanism that includes a rotational driving unit and that supplies the oxidant gas to the oxidant gas supply channel as the rotational driving unit rotates, and a pressure adjusting valve that adjusts a pressure in the cathode electrode. The method includes performing flow rate control so as to adjust a supply flow rate of the oxidant gas to the cathode electrode by adjusting an opening degree of the pressure adjusting valve while maintaining a rotation speed of the rotational driving unit at the lowest when the rotation speed of the rotational driving unit is the lowest, the oxidant gas supply mechanism supplies the oxidant gas at a lowest supply flow rate, and a required oxidant gas flow rate to the cathode electrode is lower than the lowest supply flow rate.

According to another aspect of the present invention, a method for controlling a fuel cell system including a fuel cell which includes an anode electrode and a cathode electrode sandwiching a solid polymer electrolyte membrane therebetween, includes driving a pump to supply an oxidant gas to the cathode electrode. The pump has a minimum supply amount of the oxidant gas. A fuel gas is supplied to the anode electrode to generate electric power via an electrochemical reaction between the fuel gas and the oxidant gas. It is determined whether a target amount of the oxidant gas to be supplied to the cathode electrode is lower than the minimum supply amount. An opening degree of a pressure adjusting valve is adjusted to adjust an amount of the oxidant gas supplied to the cathode electrode to be the target amount when the target amount is determined to be lower than the minimum supply amount.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
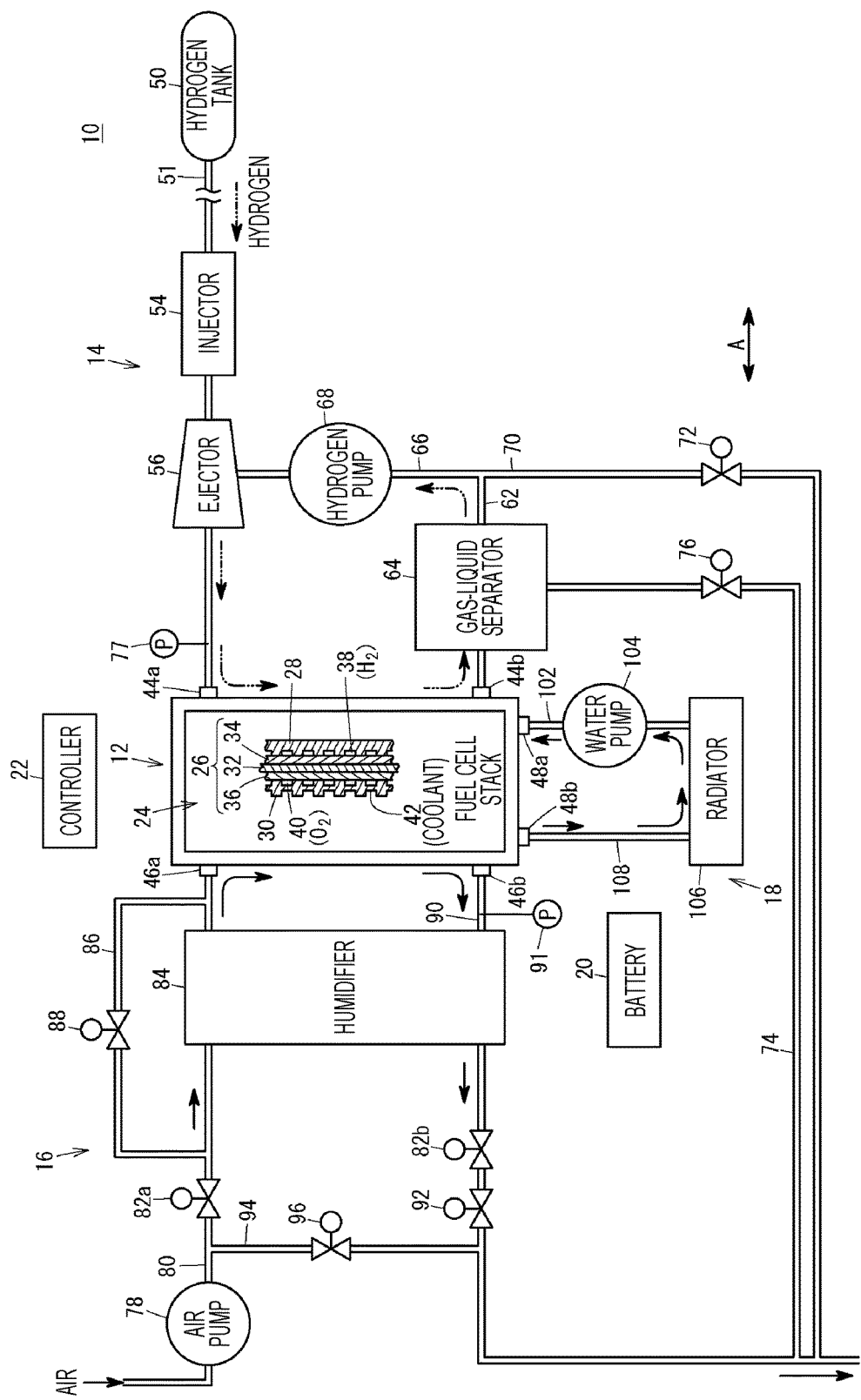
FIG. 1 is a schematic diagram of a fuel cell system to which a method according to an embodiment of the present disclosure is applied.

The embodiments will now be described with reference to the accompanying drawings, wherein like reference numerals designate corresponding or identical elements throughout the various drawings.

Hereinafter, an embodiment of a method for controlling a fuel cell system according to the present disclosure will be described in detail with reference to the drawings.

First, a fuel cell system 10 will be described with reference to FIG. 1, which is a schematic diagram. The fuel cell system 10 includes a fuel cell stack 12 (fuel cell).

The fuel cell stack 12 includes a fuel gas supply device 14 that supplies a fuel gas, an oxidant gas supply device 16 that supplies an oxidant gas, and a coolant supply device 18 that supplies a coolant. In the present embodiment, hydrogen gas is used as the fuel gas, and compressed air is used as the oxidant gas. The fuel cell system 10 further includes a battery 20 that is an energy storage device, and a controller 22 that is a system control device.

The fuel cell stack 12 includes a plurality of power generation cells 24 that are stacked in the direction of arrow A (a horizontal direction or a vertical direction) in FIG. 1. In each of the power generation cells 24, a membrane electrode assembly 26 is sandwiched between a first separator 28 and a second separator 30. The first separator 28 and the second separator 30 are made of metal or carbon.

The membrane electrode assembly 26 includes, for example, a solid polymer electrolyte membrane 32, which is a thin water-soaked perfluorosulfonic acid membrane, and an anode electrode 34 and a cathode electrode 36 that sandwich the solid polymer electrolyte membrane 32. Instead of a fluoropolymer electrolyte, a hydrocarbon (HC) electrolyte may be used as the solid polymer electrolyte membrane 32.

A hydrogen gas channel 38 (fuel gas channel), for supplying hydrogen gas to the anode electrode 34, is formed on a surface of the first separator 28 facing the membrane electrode assembly 26. An air channel 40, for supplying air to the cathode electrode 36, is formed on a surface of the second separator 30 facing the membrane electrode assembly 26. A coolant channel 42, through which a coolant flows, is formed between the first separator 28 and the second separator 30 that are adjacent to each other.

The fuel cell stack 12 has a hydrogen gas inlet 44a, a hydrogen gas outlet 44b, an air inlet 46a, an air outlet 46b, a coolant inlet 48a, and a coolant outlet 48b. The hydrogen gas inlet 44a extends through the power generation cells 24 in the stacking direction and is connected to the supply side of the hydrogen gas channel 38. Likewise, the hydrogen gas outlet 44b extends through the power generation cells 24 in the stacking direction and is connected to the discharge side of the hydrogen gas channel 38. The hydrogen gas channel 38, the hydrogen gas inlet 44a, and the hydrogen gas outlet 44b constitute an anode channel.

Likewise, the air inlet 46a extends through the power generation cells 24 in the stacking direction and is connected to the supply side of the air channel 40. The air outlet 46b extends through the power generation cells 24 in the stacking direction and is connected to the discharge side of the air channel 40. The air channel 40, the air inlet 46a, and the air outlet 46b constitute a cathode channel.

The coolant inlet 48a extends through the power generation cells 24 in the stacking direction and is connected to the supply side of the coolant channel 42. The coolant outlet 48b extends through the power generation cells 24 in the stacking direction and is connected to the discharge side of the coolant channel 42.

The fuel gas supply device 14 includes a hydrogen tank 50 that stores high-pressure hydrogen gas. The hydrogen tank 50 is connected to the hydrogen gas inlet 44a of the fuel cell stack 12 through a hydrogen gas supply passage 51 (fuel gas supply channel). The hydrogen gas is supplied to the fuel cell stack 12 through the hydrogen gas supply passage 51.

An injector 54 and an ejector 56 are arranged in series in the hydrogen gas supply passage 51. When the pressure in the ejector 56 becomes a negative pressure, hydrogen is sucked from a hydrogen circulation channel 66.

A hydrogen gas discharge passage 62 (anode off-gas discharge path) is connected to the hydrogen gas outlet 44b of the fuel cell stack 12. Exhaust hydrogen gas (anode off-gas), which is hydrogen gas that has at least partially been used in the anode electrode 34, is discharged from the fuel cell stack 12 through the hydrogen gas discharge passage 62.

A gas-liquid separator 64 is disposed in the hydrogen gas discharge passage 62. The hydrogen circulation channel 66 branches off from a position downstream of the gas-liquid separator 64, and a downstream portion of the hydrogen circulation channel 66 is connected to the ejector 56. A hydrogen pump 68 is disposed in the hydrogen circulation channel 66. In particular, when activated, the hydrogen pump 68 causes the anode off-gas, which has been discharged to the hydrogen gas discharge passage 62, to circulate to the hydrogen gas supply passage 51 through the hydrogen circulation channel 66 and the ejector 56.

One end of a purge channel 70 is connected to the hydrogen gas discharge passage 62, and a purge valve 72 is disposed in the purge channel 70. One end of a drain channel 74, for draining a fluid mainly including a liquid component, is connected to a bottom portion of the gas-liquid separator 64. A drain valve 76 is disposed in the drain channel 74. The fuel gas supply device 14 includes a pressure sensor 77 for detecting hydrogen gas pressure in the anode channel. The pressure sensor 77 is disposed, for example, in the hydrogen gas supply passage 51 at a position near the hydrogen gas inlet 44a. The pressure sensor 77 sends a detection signal to the controller 22.

The oxidant gas supply device 16 includes an air pump 78, which is disposed in an air supply passage 80 (oxidant gas supply channel) and which corresponds to an oxidant gas supply mechanism. The air pump 78 is a compressor that includes a motor, which corresponds to a rotational driving unit, and that compresses and supplies air. That is, the air pump 78 compresses air as the motor rotates and supplies the compressed air to the fuel cell stack 12 through the air supply passage 80.

Detailed description of the air pump 78 will be omitted, because an air pump having the aforementioned structure is known.

The air supply passage 80 is located downstream of the air pump 78 and connected to the air inlet 46a of the fuel cell stack 12, and a supply on-off valve 82a (inlet shut-off valve) and a humidifier 84 are disposed between the air pump 78 and the air inlet 46a. A bypass supply passage 86, which bypasses the humidifier 84, is connected to the air supply passage 80. An on-off valve 88 is disposed in the bypass supply passage 86.

An air discharge passage 90 (cathode off-gas discharge passage) is connected to the air outlet 46b of the fuel cell stack 12. Exhaust compressed air (cathode off-gas), which is compressed air that has at least partially been used in the cathode electrode 36, is discharged from the fuel cell stack 12 through the air discharge passage 90.

The oxidant gas supply device 16 includes a pressure sensor 91 for detecting the pressure of compressed air in the cathode channel. The pressure sensor 91 is disposed, for example, in the air discharge passage 90 at a position near the air outlet 46b. The pressure sensor 91 sends a detection signal of the detected pressure to the controller 22.

The humidifier 84 is disposed downstream of the air discharge passage 90. Therefore, the humidifier 84 exchanges water and heat between the compressed air supplied from the air pump 78 and the cathode off-gas. A discharge on-off valve 82b (outlet shut-off valve) and a back-pressure valve 92 are disposed in the air discharge passage 90 at positions downstream of the humidifier 84. The other end of the purge channel 70 and the other end of the drain channel 74 are connected and joined to a downstream portion of the air discharge passage 90, thereby forming a diluting portion.

The back-pressure valve 92 is pressure adjusting valve that is used to control the pressure of compressed air supplied to the cathode channel. That is, the internal pressure of the cathode electrode 36 is adjusted by the back-pressure valve 92.

Two ends of an air bypass channel 94 are respectively connected to the air supply passage 80 and the air discharge passage 90 at a position upstream of the supply on-off valve 82a and at a position downstream of the discharge on-off valve 82b and downstream of the back-pressure valve 92. A BP-flow-rate adjusting valve 96, which is used to adjust the flow rate of air that flows through the air bypass channel 94, is disposed in the air bypass channel 94.

The coolant supply device 18 includes a coolant supply passage 102 that is connected to the coolant inlet 48a of the fuel cell stack 12, and a water pump 104 is disposed in the coolant supply passage 102. The coolant supply passage 102 is connected to a radiator 106; and a coolant discharge passage 108, which is connected to the coolant outlet 48b, is connected to the radiator 106.

Next, a method for controlling the fuel cell system 10 according to the present embodiment will be described in relation to the operation of the fuel cell system 10.

The fuel cell system 10, having the above structure, is mounted, for example, in a fuel cell vehicle (not shown), such as a fuel cell electric automobile. Hereinafter, this example will be described.

When starting a fuel cell vehicle, the ignition is turned on and the fuel cell stack 12 is activated. At this time, the controller 22 sends an instruction signal for opening the injector 54 to supply hydrogen gas from the fuel gas supply device 14 to the anode channel. Thus, a predetermined amount of hydrogen gas is supplied from the hydrogen tank 50 to the hydrogen gas supply passage 51, the hydrogen gas flows through the injector 54 and the ejector 56, and the hydrogen gas is supplied to the hydrogen gas inlet 44a of the fuel cell stack 12.

The hydrogen gas flows from the hydrogen gas inlet 44a into the hydrogen gas channel 38 and moves along the hydrogen gas channel 38. Thus, the hydrogen gas is supplied to the anode electrode 34 of the membrane electrode assembly 26.

Moreover, the controller 22 sends an instruction signal for activating the air pump 78 to supply compressed air from the oxidant gas supply device 16. Accordingly, the air pump 78 rotates to compress air and to feed the compressed air to the air supply passage 80. The compressed air is moistened while passing through the humidifier 84 and then supplied to the air inlet 46a of the fuel cell stack 12. The compressed air flows from the air inlet 46a into the air channel 40 and then moves along the air channel 40, and thereby the compressed air is supplied to the cathode electrode 36 of the membrane electrode assembly 26.

Accordingly, in the membrane electrode assembly 26, the hydrogen gas supplied to the anode electrode 34 and oxygen in the compressed air supplied to the cathode electrode 36 cause an electrochemical reaction in the electrode catalyst layers and electric power is generated. A part of moisture added to the compressed air by the humidifier 84 permeates from the cathode electrode 36 into the solid polymer electrolyte membrane 32 and reaches the anode electrode 34.

In the coolant supply device 18, the water pump 104 operates to supply a coolant, such as pure water, ethylene glycol, oil, or the like from the coolant supply passage 102 to the coolant inlet 48a of the fuel cell stack 12. The coolant flows along the coolant channel 42, cools the power generation cells 24, and then is discharged from the coolant outlet 48b to the coolant discharge passage 108.

The hydrogen gas supplied to the anode electrode 34 and partially consumed is discharged from the hydrogen gas outlet 44b to the hydrogen gas discharge passage 62 as anode off-gas. At this time, the anode off-gas carries moisture (water) that has reached the anode electrode 34 as described above. That is, the anode off-gas that flows into the gas-liquid separator 64 is a moist gas including water.

The gas-liquid separator 64 separates most of water in the anode off-gas. The liquid (water) is discharged from the drain channel 74 when the drain valve 76 is opened. The anode off-gas, from which water has been separated but in which a small amount of mist remains, flows from the hydrogen gas discharge passage 62 into the hydrogen circulation channel 66 as the hydrogen pump 68 operates. Then, the anode off-gas is sucked into the ejector 56 from the hydrogen circulation channel 66, joins a flow of new hydrogen gas that has passed through the injector 54, and is supplied to the anode channel from the hydrogen gas supply passage 51. Thus, the anode off-gas is circulated and supplied to the fuel cell stack 12.

The anode off-gas that has been discharged to the hydrogen gas discharge passage 62 is discharged (purged), as necessary, to the outside as the purge valve 72 is opened.

Likewise, compressed air that has been supplied to the cathode electrode 36 and partially consumed is discharged from the air outlet 46b to the air discharge passage 90 as cathode off-gas. The cathode off-gas flows through the humidifier 84 to humidify new compressed air supplied from the air supply passage 80, the pressure of the cathode off-gas is adjusted to a set pressure of the back-pressure valve 92, and the cathode off-gas is discharged to the diluting portion.

While the fuel cell stack 12 is performing a normal operation as described above, the pressure sensor 91 detects the pressure in the cathode channel and sends a signal of the detection result to the controller 22. When receiving the signal, the controller 22 adjusts the opening degree of the back-pressure valve 92 so that the pressure in the cathode channel (the internal pressure of the cathode electrode 36) falls within a predetermined range. During the normal operation, control is performed so as to keep the pressure in the cathode channel substantially constant.

At the same time, the pressure sensor 77 detects the pressure in the anode channel. The detection result is also sent to the controller 22. The controller 22 determines whether or not the difference between the pressure in the anode channel and the pressure in the cathode channel is within a predetermined range.

For example, when the fuel cell vehicle is idling, a load on the fuel cell stack 12, that is, a required output electric current is low. In this case, the required air flow rate (required oxidant gas flow rate) of the fuel cell stack 12 is also low. Therefore, the controller 22 reduces the supply amount of compressed air to the air supply passage 80. To be specific, the controller 22 sends an instruction signal for "decreasing the rotation speed of the motor" to the air pump 78. When receiving the signal, the rotation speed of the motor decreases.

For example, when the idling state continues for a long time, the required air flow rate becomes the lowest. At this time, the controller 22 controls the motor so that the rotation speed of the motor becomes the lowest, and the supply flow rate of compressed air from the air pump 78 also becomes the lowest. The supply flow rate at this time is the lowest supply flow rate.

The suppliable flow rate of the air pump 78 has been set beforehand in accordance with the rotation speed of the motor. Therefore, when the required air flow rate is very low, even if the supply flow rate of compressed air is the lowest supply flow rate, it may occur that the lowest supply flow rate is higher than the required air flow rate (the required air flow rate is lower than the lowest supply flow rate). If this occurred, the solid polymer electrolyte membrane 32 might become dry because compressed air would be supplied to the cathode electrode 36 at a rate higher than the required air flow rate.

Figure 2:
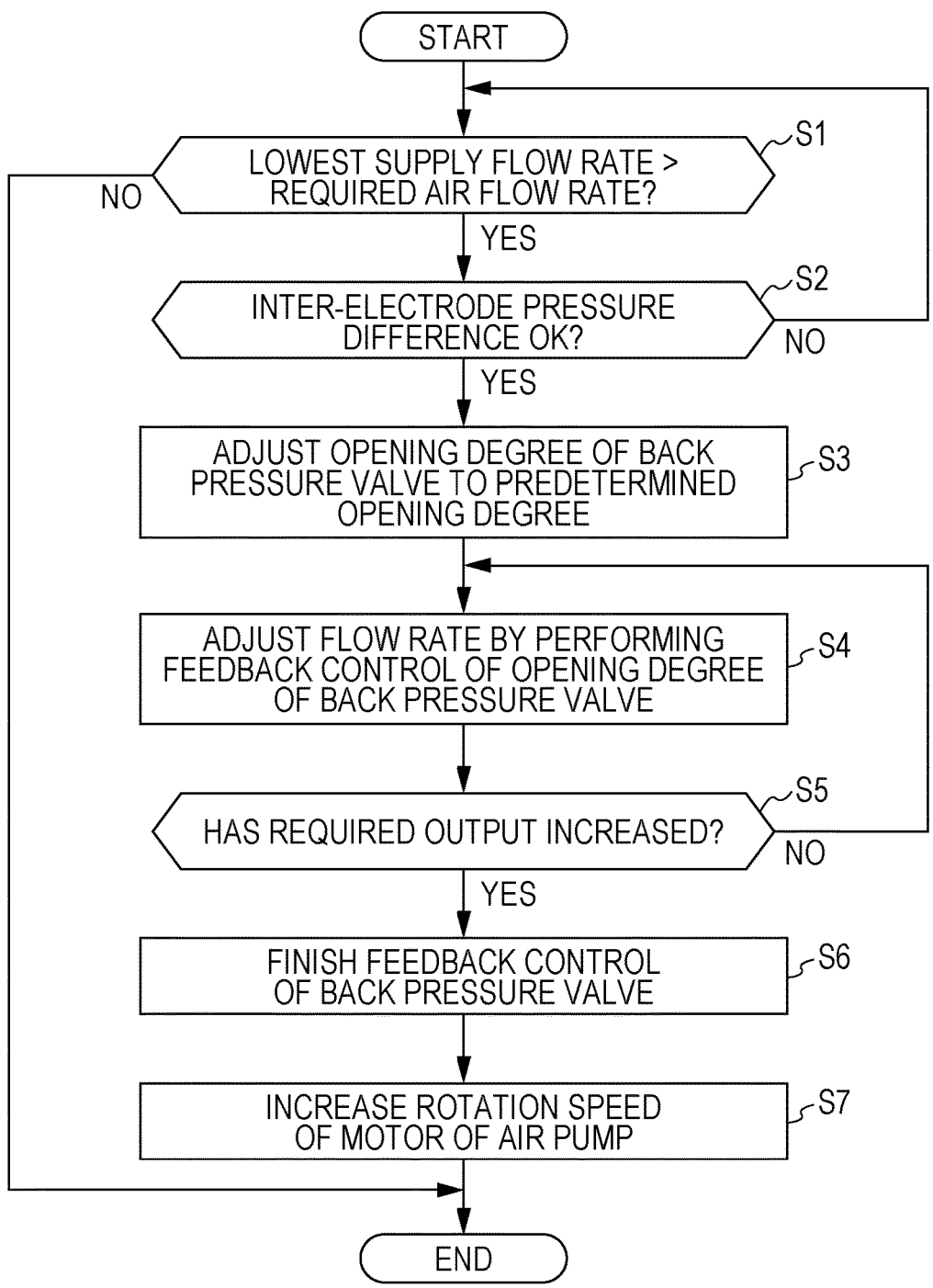
FIG. 2 is a flowchart of the method according to the present embodiment.

In the present embodiment, the controller 22 performs predetermined control to prevent this. Referring to FIG. 2, this control will be described.

When the required air flow rate is lower than the lowest supply flow rate ("YES" in step S1), in step S2, the controller 22 calculates the difference between the pressure in the anode channel (the internal pressure of the anode electrode 34) and the pressure in the cathode channel (the internal pressure of the cathode electrode 36), that is, a so-called "inter-electrode pressure difference" on the basis of detection signals of the pressure sensors 77 and 91.

When the inter-electrode pressure difference is not within a predetermined range, the controller 22 returns to step S1 without operating the back-pressure valve 92. Thus, breakage of the solid polymer electrolyte membrane 32, which may occur if the inter-electrode pressure difference becomes excessively large, is avoided.

When the inter-electrode pressure difference is within the predetermined range, the process proceeds to step S3, and the controller 22 adjusts the opening degree of the back-pressure valve 92. For example, when the opening degree of the back-pressure valve 92 is reduced, it becomes difficult for compressed air to flow through the cathode channel. Thus, in this step, the back-pressure valve 92 adjusts the flow rate of compressed air.

In summary, when the required air flow rate becomes lower than the lowest supply flow rate, the opening degree of the back-pressure valve 92 is appropriately adjusted, and thereby the flow rate of compressed air in the cathode channel is adjusted. In order to prevent an excessive amount of compressed air from being supplied to the cathode electrode 36, normally, control is performed so as to reduce the opening degree of the back-pressure valve 92. The rotation speed of the air pump 78 is maintained at the lowest rotation speed. Therefore, the supply flow rate of compressed air from the air pump 78 can be prevented from increasing.

Here, the opening degree of the back-pressure valve 92 is reduced to a predetermined opening degree (set opening degree) at a constant operation speed. Until the opening degree becomes the predetermined opening degree, control (for example, feedback control) for adjusting the opening degree of the back-pressure valve 92 to make the supply flow rate to a level corresponding to the required air flow rate is not performed. Therefore, the opening degree of the back-pressure valve 92 is prevented from being reduced sharply. Thus, it is possible to prevent purge, which is described above, from becoming infeasible and to prevent the hydrogen concentration in the anode off-gas from increasing.

After the opening degree of the back-pressure valve 92 has become a predetermined opening degree, the process proceeds to step S4, and the controller 22 starts feedback (FB) control. That is, the controller 22 detects the flow rate of compressed air that flows through the cathode channel, or in other words, the supply flow rate, and compares the supply flow rate with the required air flow rate. In accordance with the difference between the supply flow rate and the required air flow rate, the controller 22 adjusts the flow rate of the back-pressure valve 92. For example, when the required air flow rate is higher than the supply flow rate, the opening degree of the back-pressure valve 92 is increased slightly. In contrast, when the required air flow rate is lower than the supply flow rate, the opening degree of the back-pressure valve 92 is reduced slightly.

By adjusting the opening degree of the back-pressure valve 92 in this say, it is possible to appropriately adjust the flow rate of compressed air in the cathode channel. Accordingly, it is not necessary to change the rotation speed of the motor of the air pump 78 in order to adjust the flow rate of compressed air. Adjustment of the opening degree of the back-pressure valve 92 can be performed more precisely than adjustment of the rotation speed of the motor. Therefore, this method provides an advantage in that the flow rate of compressed air can be adjusted with high precision.

As described above, the flow rate of compressed air in the cathode channel can be adjusted to a flow rate corresponding to the required air flow rate. Accordingly, even if the required air flow rate becomes lower than the lowest supply flow rate of the air pump 78, it is possible to prevent compressed air from being supplied to the cathode electrode 36 at a flow rate higher than the required air flow rate and to prevent the solid polymer electrolyte membrane 32 from becoming dry due to excessive supply of compressed air.

The controller 22 determines whether or not the required output of the fuel cell stack 12 has increased (step S5). If the required output has not increased, the FB control on the back-pressure valve 92 is continuously performed. If the required output of the fuel cell has increased at a rate of change higher than a predetermined rate of change because, for example, the accelerator of the fuel cell vehicle was depressed, the process proceeds to step S6.

In this case, the required air flow rate is higher than the supply flow rate of compressed air in the cathode channel. Accordingly, the controller 22 finishes the FB control on the back-pressure valve 92. As a result, adjustment of the flow rate of compressed air by the back-pressure valve 92 is finished, and the opening degree of the back-pressure valve 92 increases.

At this time, the back-pressure valve 92 is opened at a constant operation speed to a predetermined opening degree, for example, to be fully opened. Until the opening degree of the back-pressure valve 92 becomes the predetermined opening degree, control for adjusting the opening degree of the back-pressure valve 92 (FB control) in accordance with the pressure in the cathode channel is not performed. Therefore, the response time from depression of the accelerator to acceleration of fuel cell vehicle is reduced.

The operation speed of the back-pressure valve 92 is set in accordance with the rate of change in required output. For example, when the depression amount of the accelerator is small, the rate of change in required output is also low. In this case, the operation speed of the back-pressure valve 92 can be set low. Thus, it is possible to prevent the back-pressure valve 92 from being rapidly opened and a large amount of compressed air that has not reacted from being discharged to the air discharge passage 90.

In contrast, the operation speed of the back-pressure valve 92 can be set high when the depression amount of the accelerator is large and the rate of change in the required output is high. Thus, compressed air is supplied with an amount corresponding to the required air flow rate, and therefore the fuel cell vehicle can have a sufficiently high response speed.

When finishing control of the flow rate of compressed air by using the back-pressure valve 92 as described above, the controller 22 increases the rotation speed of the motor of the air pump 78 (step S7). Accordingly, the supply flow rate of compressed air increases to a level corresponding to the required air flow rate, and the compressed air is supplied to the cathode electrode 36. When the supply flow rate of compressed air reaches the level corresponding to the required air flow rate, the operation returns to a normal operation.

The present disclosure is not limited to the embodiment described above, which can be modified in various ways within the spirit and scope of the present disclosure.

For example, the pressure sensors 77 and 91 need not be disposed respectively near the hydrogen gas inlet 44a and the air outlet 46b, and may be disposed at any positions where the internal pressures of the anode electrode 34 and the cathode electrode 36 can be detected.

According to one aspect of the present disclosure, a method for controlling a fuel cell system including a fuel cell that includes a membrane electrode assembly in which a solid polymer electrolyte membrane is sandwiched between an anode electrode and a cathode electrode and that generates electric power by causing an electrochemical reaction between a fuel gas that is supplied through a fuel gas supply channel to the anode electrode and an oxidant gas that is supplied through an oxidant gas supply channel to the cathode electrode, an oxidant gas supply mechanism that includes a rotational driving unit and that supplies the oxidant gas to the oxidant gas supply channel as the rotational driving unit rotates, and a pressure adjusting valve that adjusts a pressure in the cathode electrode. The method includes performing flow rate control so as to adjust a supply flow rate of the oxidant gas to the cathode electrode by adjusting an opening degree of the pressure adjusting valve while maintaining a rotation speed of the rotational driving unit at the lowest when the rotation speed of the rotational driving unit is the lowest, the oxidant gas supply mechanism supplies the oxidant gas at a lowest supply flow rate, and a required oxidant gas flow rate to the cathode electrode is lower than the lowest supply flow rate.

In the present disclosure, when the required oxidant gas flow rate is lower than the lowest supply flow rate, which is determined in accordance with the lowest rotation speed of the rotational driving unit of the oxidant gas supply mechanism, flow rate control of the oxidant gas is performed by using the pressure adjusting valve in a state in which the rotation speed of the rotational driving unit is maintained at the lowest rotation speed (the supply flow rate of the oxidant gas is maintained at the lowest supply flow rate). For example, an actual supply flow rate of the oxidant gas supplied to cathode electrode can be made lower than the lowest supply flow rate by reducing the opening degree of the pressure adjusting valve.

Accordingly, excessive oxidant gas is prevented from being supplied to the cathode electrode. Therefore, the solid polymer electrolyte membrane is prevented from becoming dry, and therefore it is possible to avoid the risk that the proton conductivity of the solid polymer electrolyte membrane decreases.

When operating the pressure adjusting valve (changing the opening degree) before performing the flow rate control, preferably, the pressure adjusting valve is operated at a constant operation speed until the opening degree of the pressure adjusting valve becomes a predetermined opening degree. By doing so, for example, the opening degree is prevented from decreasing sharply. In this case, because the supply flow rate of the oxidant gas is prevented from decreasing sharply, it is possible to prevent purge, using cathode off-gas, from becoming infeasible and to prevent the hydrogen concentration in the anode off-gas from increasing.

Preferably, the operation speed is set high when the rate of change in the required output is high, and the operation speed is set low when the rate of change is low. By doing so, it is possible to obtain a sufficiently high response speed when the rate of change is high and to prevent excessive oxidant gas from being supplied when the rate of change is low.

Preferably, after the opening degree of the pressure adjusting valve has become the predetermined opening degree, the opening degree of the pressure adjusting valve is adjusted by performing feedback control on the basis of the required oxidant gas flow rate and the supply flow rate of the oxidant gas to the cathode electrode. Although it is possible to adjust the supply flow rate by adjusting the rotation speed of the rotational driving unit of the oxidant gas supply mechanism, more precise control can be performed by adjusting the opening degree of the pressure adjusting valve. That is, in this case, the supply flow rate of the oxidant gas can be controlled with high precision.

The flow rate control using the pressure adjusting valve may be finished, for example, at a timing at which the rate of change in the required output of the fuel cell increases at a rate of change higher than a predetermined rate of change. This is because, in this case, the required oxidant gas flow rate is higher than or equal to the flow rate of oxidant gas supplied to the cathode electrode, and it is allowable to use the pressure adjusting valve for internal pressure control of the cathode electrode again and to increase the rotation speed of the rotational driving unit to a level higher than or equal to the lowest supply flow rate. Because the rate of change in the required output is the same as the rate of change in the required electric current, determination may be made by using the rate of change in the required electric current.

Preferably, after the flow rate control has been finished, the pressure adjusting valve may be operated at a constant operation speed until the opening degree of the pressure adjusting valve becomes a predetermined opening degree. In this case, the output of the fuel cell increases to the required output in a short time. That is, a sufficiently high response speed can be achieved.

In the above cases, before performing the flow rate control, preferably, the opening degree of the pressure adjusting valve is not adjusted, that is, flow rate control is not performed when a difference (inter-electrode pressure difference) between the internal pressure of the cathode electrode and the internal pressure of the anode electrode is larger than a predetermined threshold. In this case, the balance of the pressure acting on the solid polymer electrolyte membrane is maintained, and therefore breakage of the solid polymer electrolyte membrane can be avoided.

With the present disclosure, when the required oxidant gas flow rate is lower than the lowest supply flow rate of the oxidant gas supply mechanism, flow rate control of the oxidant gas is performed by adjusting the opening degree of the pressure adjusting valve. Therefore, the actual amount of oxidant gas supplied to the cathode electrode can be made lower than the lowest supply flow rate.

Therefore, excessive oxidant gas is prevented from being supplied to the cathode electrode, and therefore the solid polymer electrolyte membrane can be prevented from becoming dry.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell system,
the fuel cell system including
a fuel cell that includes a membrane electrode assembly in which a solid polymer electrolyte membrane is sandwiched between an anode electrode and a cathode electrode and that generates electric power by causing an electrochemical reaction between a fuel gas that is supplied through a fuel gas supply channel to the anode electrode and an oxidant gas that is supplied through an oxidant gas supply channel to the cathode electrode,
an oxidant gas supply mechanism that includes a rotational driving unit and that supplies the oxidant gas to the oxidant gas supply channel as the rotational driving unit rotates, and
a pressure adjusting valve that adjusts a pressure in the cathode electrode,
the method comprising:
performing flow rate control so as to adjust a supply flow rate of the oxidant gas to the cathode electrode by adjusting an opening degree of the pressure adjusting valve while maintaining a rotation speed of the rotational driving unit at the lowest when
the rotation speed of the rotational driving unit is the lowest,
the oxidant gas supply mechanism supplies the oxidant gas at a lowest supply flow rate, and
a required oxidant gas flow rate to the cathode electrode is lower than the lowest supply flow rate.

2. The method according to claim 1,
wherein, when the required oxidant gas flow rate is lower than the lowest supply flow rate, the pressure adjusting valve is operated at a constant operation speed until the opening degree of the pressure adjusting valve becomes a predetermined opening degree, and, subsequently, the flow rate control is performed.

3. The method according to claim 1,
wherein, after the opening degree of the pressure adjusting valve has become the predetermined opening degree, the opening degree of the pressure adjusting valve is adjusted by performing feedback control based on the required oxidant gas flow rate and the supply flow rate of the oxidant gas to the cathode electrode.

4. The method according to claim 1,
wherein, when a rate of change in a required output of the fuel cell increases at a rate of change higher than a predetermined rate of change, the flow rate control using the pressure adjusting valve is finished and the rotation speed of the rotational driving unit is increased.

5. The method according to claim 4,
wherein, after the flow rate control has been finished, the pressure adjusting valve is operated at a constant operation speed until the opening degree of the pressure adjusting valve becomes a predetermined opening degree.

6. The method according to claim 5,
wherein the operation speed is set high when the rate of change in the required output is high, and the operation speed is set low when the rate of change is low.

7. The method according to claim 1,
wherein the opening degree of the pressure adjusting valve is not adjusted when
the rotation speed of the rotational driving unit is the lowest,
the oxidant gas supply mechanism supplies the oxidant gas at the lowest supply flow rate,
the required oxidant gas flow rate of the cathode electrode is lower than the lowest supply flow rate, and
a difference between the internal pressure of the cathode electrode and the internal pressure of the anode electrode is larger than a predetermined threshold.

8. A method for controlling a fuel cell system including a fuel cell which includes an anode electrode and a cathode electrode sandwiching a solid polymer electrolyte membrane therebetween, comprising:
driving a pump to supply an oxidant gas to the cathode electrode, the pump having a minimum supply amount of the oxidant gas;
supplying a fuel gas to the anode electrode to generate electric power via an electrochemical reaction between the fuel gas and the oxidant gas;
determining whether a target amount of the oxidant gas to be supplied to the cathode electrode is lower than the minimum supply amount;
adjusting an opening degree of a pressure adjusting valve to adjust an amount of the oxidant gas supplied to the cathode electrode to be the target amount when the target amount is determined to be lower than the minimum supply amount.

9. The method according to claim 8, wherein the pump includes a rotational driving unit to supply the oxidant gas to the cathode electrode.

10. The method according to claim 9, wherein the rotational driving unit has a minimum rotational speed.

11. The method according to claim 8,
wherein, when the target amount is lower than the minimum supply amount, the pressure adjusting valve is operated at a constant operation speed until the opening degree of the pressure adjusting valve becomes a predetermined opening degree, and, subsequently, the opening degree is adjusted so as to adjust the amount of the oxidant gas.

12. The method according to claim 8,
wherein, after the opening degree of the pressure adjusting valve has become the predetermined opening degree, the opening degree of the pressure adjusting valve is adjusted by performing feedback control based on the target amount and the amount of the oxidant gas.

13. The method according to claim 9,
wherein, when a rate of change in a required output of the fuel cell increases at a rate of change higher than a predetermined rate of change, flow rate control using the pressure adjusting valve is finished and rotation speed of the rotational driving unit is increased.

14. The method according to claim 13,
wherein, after the flow rate control has been finished, the pressure adjusting valve is operated at a constant operation speed until the opening degree of the pressure adjusting valve becomes a predetermined opening degree.

15. The method according to claim 14,
wherein the operation speed is set high when the rate of change in the required output is high, and the operation speed is set low when the rate of change is low.

16. The method according to claim 9,
wherein the opening degree of the pressure adjusting valve is not adjusted when
rotation speed of the rotational driving unit is the lowest speed, an oxidant gas supply mechanism supplies the oxidant gas at the minimum supply amount,
the target amount is lower than the minimum supply amount, and
a difference between internal pressure of the cathode electrode and internal pressure of the anode electrode is larger than a predetermined threshold.

* * * * *